United States Patent [19]

Taylor

[11] 4,441,724
[45] Apr. 10, 1984

[54] FLUID-TIGHT SEAL

[75] Inventor: Laurence D. Taylor, Erie, Pa.

[73] Assignee: American Sterilizer Company, Erie, Pa.

[21] Appl. No.: 244,240

[22] Filed: Mar. 16, 1981

[51] Int. Cl.³ .............................................. F16J 15/02
[52] U.S. Cl. .................................. 277/166; 277/180; 277/206 A
[58] Field of Search .................... 277/206.1, 180, 166, 277/235 R

[56] References Cited

U.S. PATENT DOCUMENTS

| 2,532,891 | 5/1950 | Chupp | 277/180 |
| 2,882,081 | 4/1959 | Tobias | 277/166 |
| 3,231,289 | 1/1966 | Carrell | 277/180 |
| 4,118,041 | 10/1978 | Futamura | 277/180 |

FOREIGN PATENT DOCUMENTS

| 548545 | 11/1957 | Canada | 277/180 |
| 967538 | 8/1964 | United Kingdom | 277/180 |

Primary Examiner—Robert I. Smith
Attorney, Agent, or Firm—Robert D. Yeager

[57] ABSTRACT

A fluid-tight seal formed by a dual, surface mounted sealing gasket is disclosed. The gasket has a web joining the spaced sealing members. The web engages post members mounted along one of the surfaces to be sealed. The post members serve as spacing means for the surfaces to be sealed, thereby to prevent undue crushing forces on the sealing gasket.

5 Claims, 4 Drawing Figures

FLUID-TIGHT SEAL

BACKGROUND OF THE INVENTION

1. Field of the Invention

This invention relates to apparatus for forming a fluid-tight seal between confronting surfaces; more particularly, to a surface-mounted gasket having dual sealing members.

2. Description of the Prior Art

Providing a reliable, durable seal between an opening in a pressure vessel and its closure has posed a continuing challenge to workers in the art despite the many inovations in materials for use in sealing devices. In a sterilizer, for example, which may operate under both positive and negative pressures during a given sterilization cycle, there exists the problem of providing an effective seal between the sterilizer door and the door frame under conditions of high door usage.

Sealing gaskets for sterilizer doors, whether mounted on the door or on the frame, traditionally have been held in place by means of gasket bars, which extend around the perimeter of the opening to be sealed and involve the application of considerable labor during installation and removal of a gasket, or precisely machined grooves in one of the surfaces to be sealed. The latter hold the base of the gasket in place and require close tolerances with the gasket dimensions to be effective.

A further problem associated with sealing gaskets for sterilizer doors is the tendency of the gasket material to acquire permanent deformation (or set) after being repeatedly crushed between the surfaces to be sealed. This problem is most critical when a compression-type sealing gasket is employed because a certain amount of compressive force on the gasket is necessary to effect a seal. When excessive compression is applied, principally by the sealing surfaces being brought too closely together for the particular gasket present, there is a drastic reduction in the life of the gasket due to the permanent deformation or set.

When a lip seal gasket is employed, crushing of the seal is not essential to its operation because the seal depends for its effectiveness on the presence of a pressure differential across the lip. Nevertheless, undue crushing of a lip seal can cause permanent deformation of the flexible lips and a resultant decrease in seal life. As with compression seals, the maintenance of proper spacing between the surfaces to be sealed by a lip seal is vital to its operation.

In general, neither gasket bars nor grooves as mounting means for sterilizer door sealing gaskets address the problem of providing repeatable proper spacing between the surfaces to be sealed with each door closing.

SUMMARY OF THE INVENTION

The present invention overcomes the foregoing problems associated with sealing gaskets by providing a convenient means for mounting a sealing gasket on one of the surfaces to be sealed without the need for cumbersome gasket bars, and, of course, eliminating the need for a mounting groove; the gasket mounting means of the present invention also serves as a spacing means between the surfaces to be sealed, thereby diminishing the opportunity for the occurrence of permanent deformation of the seal.

The present invention provides apparatus for forming a fluid-tight seal between two confronting surfaces comprising: a plurality of spaced gasketing mounting members disposed along one of the surfaces and adapted to engage the other of the surfaces when it is brought into confronting relationship to provide a space between the confronting surfaces; gasket means longitudinally extending between the confronting surfaces and having a pair of spaced sealing members to engage the confronting surfaces to form seals therebetween; and web means joining the spaced sealing members and being detachably secured to the gasket mounting members.

Preferably, the gasket mounting members used in the present invention are rigid post members having enlarged head portions. Further, the web means of the present invention preferably is formed of elastomeric material and has a plurality of longitudinally spaced openings which, upon deformation, pass over the enlarged head portions of the post members, thereby providing means for retaining the gasket means in place.

The sealing members of the present invention preferably are either of the double lip seal variety or are cylindrical-shaped compression seals, although other types of sealing members may be useful with the present invention.

Other details and advantages of the present invention will become apparent from the following detailed description, taken with the accompanying drawing.

DETAILED DESCRIPTION OF THE PREFERRED EMBODIMENTS

Figure 1:
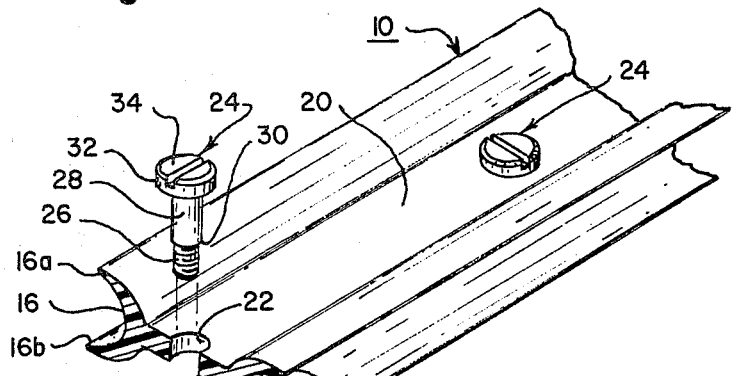
FIG. 1 is a fragmentary isometric view of a double lip sealing gasket mounted in accordance with the present invention.
Figure 2:
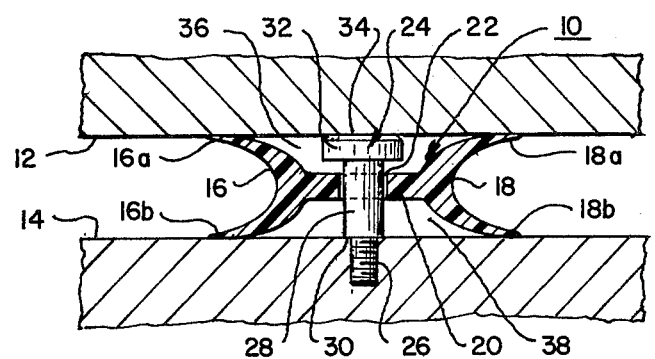
FIG. 2 is a fragmentary sectional view of the sealing gasket of FIG. 1 and the surfaces sealed thereby.

Referring to the drawings, first to FIGS. 1 and 2, there is shown a sealing gasket 10 suitable for use in forming a fluid-tight seal between confronting surfaces 12 and 14, which might represent the door and door frame, respectively, of a sterilizer. Gasket 10 is formed of any suitable elastomeric material, such as silicone rubber, and in the embodiment of FIGS. 1 and 2 is configured to form a pair of spaced, outwardly-facing, double lips 16 and 18. Each pair of double lips 16, 18 is generally C-shaped in section and symmetrical. The upper and lower portions 16a, 18a and 16b, 18b, respectively, of double lips 16, 18 taper outwardly toward their free ends. This taper is intended to provide the flexibility needed in the operation of a lip seal.

Sealing gasket 10 is especially adapted for use where there are reversing pressure differentials across gap between the surfaces to be sealed, as for example in a sterilizer which operates under both pressure and vacuum. In such an application with the sterilizer environment acting on the right side of FIG. 2 and the atmosphere acting on the left side, positive pressure in the sterilizer vessel acts against double lip 18, forcing upper and lower portions 18a and 18b, respectively, apart and into sealing engagement with surfaces 12 and 14, respectively. When the sterilizer vessel operates under vacuum, the positive pressure differential across sealing gasket 10 reverses. Now atospheric pressure acts on double lip 16, forcing upper and lower portions 16a and 16b, respectively, into sealing engagement with surfaces 12 and 14, respectively.

In the operation of sealing gasket 10 just described, it may be seen that the double lip opposite the side against which positive pressure is exerted performs no function as long as that condition exists. More importantly, however, it may be seen that this type of operation, in which forces on sealing gasket 10 alternate, requires a mounting means for sealing gasket 10 that prevents lateral displacement of gasket 10. Such a mounting means is provided by the present invention and will now be described.

Double lips 16 and 18 are joined together by web 20 which is shown in FIGS. 1 and 2 as being of rectangular cross section with some width. A series of longitudinal spaced holes 22 are formed in web 20. The spacing of holes 22 coincides with the spacing of post members 24 now to be described.

Post members 24 preferably are rigid screws with threaded end portions 26 adapted to fit into tapped bores longitudinally spaced along one of the surfaces to be sealed, in this case surface 14. Each post member 24 has a shank portion 28 which may have a shoulder 30 separating shank portion 28 from threaded portion 26 to assure that all of post members 24 project a uniform distance above surface 14. Post members 24 have enlarged head portions 32 with flat top surfaces except for appropriate grooves to be engaged by a driving member as clearly shown in the drawings.

With post members 24 in place, sealing gasket 10 may be mounted on surfaces 14 by aligning holes 22 with post members 24 which have the same spacing as holes 22. Although the diameter of each hole 22 is less then the diameter of enlarged head portion 32 of post member 24, the elastomeric properties of web 20 permit stretching to snap web 20 over the enlarged head portion.

It may be seen in FIG. 2 that when web 20 surrounds shank portion 28 of post member 24, an annular space is provided because of the difference in diameters of holes 22 and shank portion 28. This annulus provides a positive advantage to reduce a suction cup effect that may occur in the upper or lower longitudinally extending passages 36, 38 formed by sealing gasket 10 with surfaces 12 and 14. This suction cup effect otherwise would tend to opposite separation of surfaces 12 and 14, as for example when it is attempted to open a sterilizer door. The fact that web 20 can move relative to shank portion 28 of post member 24 tends to form a crease in sealing gasket 10 when surfaces 12 and 14 initially move away from one another and this creasing action tends to break the seal forming the suction cup effect.

Post members 24, in addition to forming the means for securing mounting sealing gasket 10 on surface 14, serve another important function: namely, to assure proper spacing between surfaces 12 and 14 and thereby prevent any undue crushing forces exerted by those surfaces on sealing gasket 10. When surfaces 12 and 14 are moved into confronting relationship, the top surfaces 34 of post members 24 contact surface 12 and prevent it from moving closer to surface 14. Because sealing gasket 10, fitted with double lip seals, does not depend for its operation on compressive forces exerted upon it by surfaces 12 and 14, the spacing feature provided by post members 24 is not as critical as when compression seals, next to be described, are employed. Nevertheless, undue compression forces on a lip seal can cause permanent deformation of the flexible lip members, e.g. 16a, 16b, and consequent ineffective sealing action.

Figure 3:
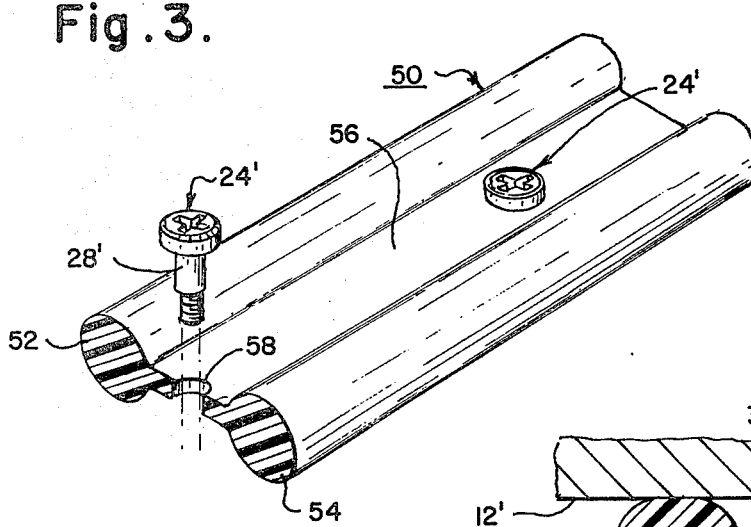
FIG. 3 is a fragmentary isometric view of a compression-type dumbbell shaped sealing gasket mounted in accordance with the present invention.
Figure 4:
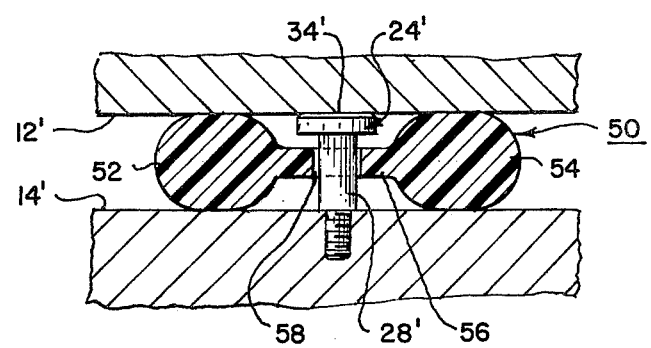
FIG. 4 is a fragmentary sectional view of the sealing gasket of FIG. 3 and the surfaces sealed thereby.

Referring now to FIGS. 3 and 4, there is shown an embodiment of the present invention in which sealing gasket 50 employs double compression-type seals. Each sealing member 52, 54 is formed of a suitable elastomer in cylindrical cross section. Sealing members 52, 54 are joined by web 56 which is constructed identically to web 20 and has a series of aligned openings 58. Sealing gasket 50 is mounted on surface 14' by means of post members 24' which are constructed and mounted into surface 14' in the same manner as post members 24. Also, the same relationship of diameters exists between each opening 58 and its corresponding shank portion 28' as was described for sealing gasket 10 to provide an annular space therebetween.

The sealing action of gasket 50 is provided by the crushing action of surfaces 12', 14' on sealing members 52, 54. As suggested above, this brings into greater prominence the advantage afforded by the spacing action provided by post members 24'. Because the top surfaces 34' of post members 24' prevent surface 12' from moving closer to surface 14' than the dimension fixed by the dimensions of post members 24', an unvarying amount of crushing force is exerted by those surfaces on sealing members 52, 54 with each door closing. With the dimensions and properties of sealing members 52, 54 properly established, both effective sealing action and the absence of permanent deformation is assured.

What is claimed is:

1. Apparatus for forming fluid-tight seal between two confronting surfaces comprising:
   a plurality of spaced rigid post members mounted to one of said surfaces and adapted to engage the other of said surfaces when it is brought into said confronting relationship to provide a space between said confronting surfaces;
   gasket means longitudinally extending between said confronting surfaces and having a pair of spaced sealing members adapted to engage said confronting surfaces to form seals therebetween; and
   deformable web means joining said spaced sealing members and having a plurality of longitudinally spaced openings formed therein,
   said post members having enlarged head portions adapted to pass through said openings in said web means by deforming said openings and thereby retain said gasket means.

2. Apparatus as recited in claim 1 wherein: said post members have shank portions, each of which being dimensioned to fit loosely within its corresponding opening in said web means.

3. Apparatus as recited in claim 1 wherein: said pair of spaced members comprise a pair of double lip seals.

4. Apparatus as recited in claim 1 wherein: said pair of spaced sealing members comprise a pair of cylindrical-shaped compression seals.

5. A fluid-tight seal comprising:
   a pair of spaced-apart, confronting surfaces to be sealed;
   a plurality of spaced gasket mounting members disposed along one of said surfaces and adapted to abut the other of said surfaces to maintain said space between said confronting surfaces;
   gasket means longitudinally extending between said confronting surfaces and having a pair of spaced sealing members adapted to engage said confronting surfaces to form seals therebetween; and web means joining said spaced sealing members and being detachably secured to said gasket mounting members.

* * * * *

UNITED STATES PATENT AND TRADEMARK OFFICE
CERTIFICATE OF CORRECTION

PATENT NO. : 4,441,724

DATED : April 10, 1984

INVENTOR(S) : Laurence D. Taylor

It is certified that error appears in the above—identified patent and that said Letters Patent is hereby corrected as shown below:

Col. 1, line 14, delete "inovations" and substitute therefor --innovations--;

Col. 2, line 7, before "to", insert --adapted--;

Col. 2, line 59, before "pressure", insert --positive--;

Col. 3, line 2, delete "atospheric" and substitute therefor --atmospheric--;

Col. 3, line 34, delete "surfaces" and substitute therefor --surface--; and

Col. 3, line 55, delete "function:" and substitute therefor --function;--.

Signed and Sealed this

Second Day of October 1984

[SEAL]

Attest:

Attesting Officer

GERALD J. MOSSINGHOFF

Commissioner of Patents and Trademarks